US006847182B2

(12) United States Patent
Ricotti

(10) Patent No.: US 6,847,182 B2
(45) Date of Patent: Jan. 25, 2005

(54) DEVICE FOR DRIVING ELECTRIC MOTORS

(75) Inventor: Giulio Ricotti, Broni (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 10/205,064

(22) Filed: Jul. 25, 2002

(65) Prior Publication Data

US 2003/0020425 A1 Jan. 30, 2003

(30) Foreign Application Priority Data

Jul. 26, 2001 (IT) ...................................... MI2001A1623

(51) Int. Cl.[7] .............................................. G05B 11/28
(52) U.S. Cl. ........................ 318/599; 318/439; 318/811; 318/812; 388/811
(58) Field of Search ................................ 318/254, 439, 318/807–812, 599, 767, 138, 560, 671, 290, 701; 388/811, 800, 804, 819, 831; 363/41

(56) References Cited

U.S. PATENT DOCUMENTS

| 4,893,067 | A | * | 1/1990 | Bhagwat et al. ............. 388/823 |
| RE35,124 | E | * | 12/1995 | Erdman et al. .............. 318/599 |
| 5,780,986 | A | * | 7/1998 | Shelton et al. .............. 318/432 |
| 5,886,484 | A | * | 3/1999 | Fucili et al. ................. 318/254 |
| 5,953,491 | A | * | 9/1999 | Sears et al. ................. 388/811 |
| 6,384,556 | B1 | * | 5/2002 | Mizumoto et al. .......... 318/293 |
| 6,402,260 | B1 | * | 6/2002 | Kobayashi et al. ........... 303/20 |

* cited by examiner

*Primary Examiner*—David Martin
*Assistant Examiner*—Renata McCloud
(74) *Attorney, Agent, or Firm*—Lisa K. Jorgenson; Jose Gutman; Fleit, Kain, Gibbons, Gutman, Bongini & Bianco P.L.

(57) ABSTRACT

A device for driving electric motors includes a power stage with a variable duty-cycle coupled to a supply voltage. The power stage is suitable for driving an electric motor. The driving device includes a circuit that is capable of raising the value of the input voltage of the power stage above the induced counter electromotive voltage of the motor in certain periods of time and a control device capable of activating the circuit in reply to values of the induced counter electromotive voltage being greater than or comparable with the supply voltage.

7 Claims, 2 Drawing Sheets

DEVICE FOR DRIVING ELECTRIC MOTORS

CROSS-REFERENCE TO RELATED APPLICATIONS

This application is based upon and claims priority from prior Italian Patent Application No. MI2001A001623 filed Jul. 26, 2001, the entire disclosure of which is herein incorporated by reference.

BACKGROUND OF THE INVENTION

1. Field of the Invention

The present invention refers to a device for driving electric motors, particularly for brushless three-phase motors.

2. Description of Related Art

Today's development in the field of computers and telecommunications is oriented more and more towards the production of smaller and lighter electronic equipment which is capable however of memorizing a remarkable quantity of data, such as palm computers or mobile phones, etc. This equipment has two fundamental characteristics in common: power supplying with lighter and lighter batteries and the need for large memory banks to store the data.

Today the cheapest devices for memorizing enormous quantities of data are the hard disks (HD) whose dimensions are becoming smaller and smaller. The HDs and in any case magnetic memorization systems require mobile mechanical parts driven by motors that do not always meet the need for low energy consumption, an indispensable characteristic for battery powering. In fact low energy consumption is essential in order to have batteries whose dimensions are smaller and smaller and which weigh less and are suitable for portable electronic equipment.

As energy is linked to the supply voltage of the equipment, lowering the consumption of energy equals lowering the supply voltage of said equipment; for example today we have passed from supply voltages at 5V to voltages of 1.5V. With such reduced power voltages, the driving of the HD motors becomes difficult to actuate because of the voltage that is generated on the motor windings for the counter electromotive force (VBEMF) induced by the rotation itself inside the magnetic field produced by the polar expansions of the permanent magnets present in the motor. This counter electromotive force depends on the rotation speed of the motor itself according to a linear relation: VBEMF=Ke*W where W is the rotation speed of the motor in rad/s and ke is a constant depending on the characteristics of the magnetic field and of the windings and is measured in V/(rad/s). Therefore a low VBEMF corresponds to low rotation speeds, while a high VBEMF corresponds to high rotation speeds.

Given that the motor is generally driven by a power stage, the variation of supply voltage of the motor is carried out by adequately varying the duty-cycle of the power stage powered by a voltage power which is in any case higher than the maximum supply voltage supplied by the power stage to the motor.

If, however, in some applications where the voltage supplied by a battery to the driving stage of a motor is low, the counter electromotive force can become comparable to or even greater than the supply voltage of the motor, and therefore it can become impossible to forcibly introduce current into the motor and therefore transfer the energy needed to it to reach and constantly maintain the rotation speed requested by the application.

SUMMARY OF THE INVENTION

In view of the state of the technique described, the object of the present invention is to present an innovative device for driving electric motors.

In accordance with the present invention, said object is reached by means of a device for driving electric motors comprising a power stage with a variable duty-cycle coupled to a supply voltage, said power stage being suitable for driving the electric motor, characterized in that it comprises a circuit capable of raising the input voltage signal value of said power stage above the induced counter electromotive voltage of the motor in certain periods of time and a control device capable of activating said circuit in reply to values of said induced counter electromotive voltage greater than or comparable with the supply voltage.

Thanks to the present invention a device for driving electric motors can be realized which, besides a first parameter of the duty-cycle of the power stage, presents a second parameter that can be varied to supply the motor with a voltage greater than the supply voltage in some periods of time. In this manner a lower supply voltage of the motor can be used than that of known driving devices.

BRIEF DESCRIPTION OF THE DRAWINGS

The characteristics and advantages of the present invention will appear evident from the following detailed description of an embodiment thereof, illustrated as non-limiting example in the enclosed drawings, in which.

DETAILED DESCRIPTION

Figure 1:
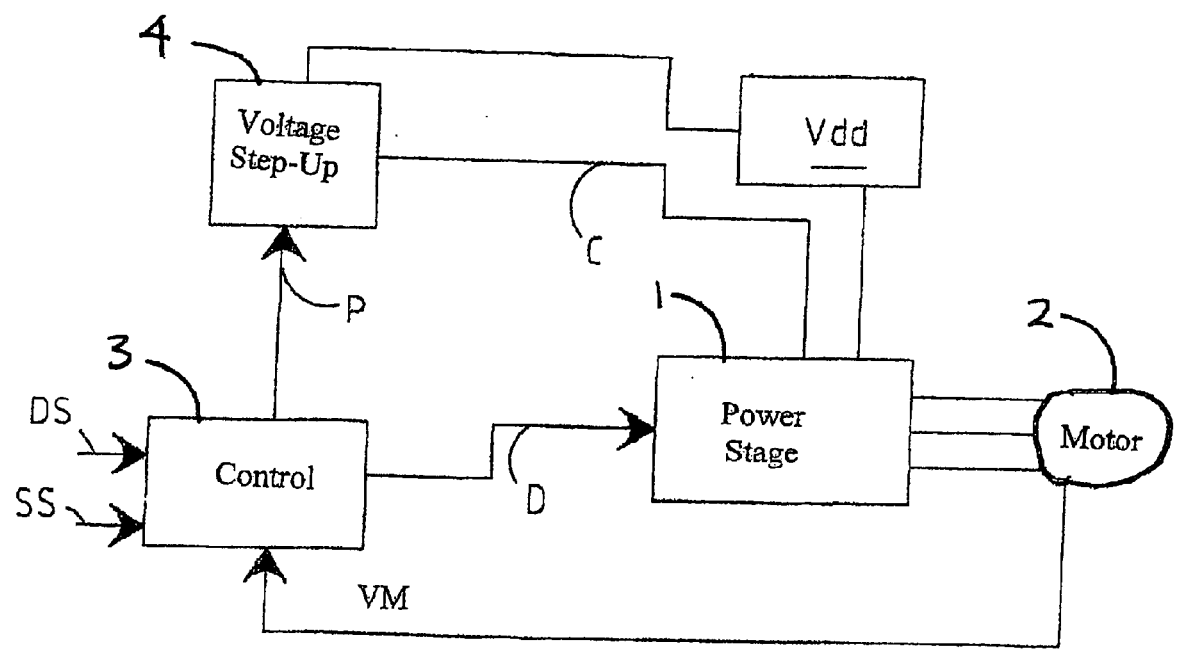
FIG. 1 is a schematic view of the electric motor driving device according to the invention.

The driving device for electric motors according to the invention is shown in FIG. 1. This driving device comprises a power stage 1 for driving a motor 2, already known and having a variable duty-cycle, a control block 3 that receives information regarding the speed of the motor by means of a VM signal and receives external signals SS and DS for setting the speed and duty-cycle value and acts upon the power stage 1 by means of a signal D and on a voltage raiser 4, for example a step-up, connected to a supply voltage Vdd by means of a signal P; the step-up 4 is connected to the power stage 1.

Figure 3:
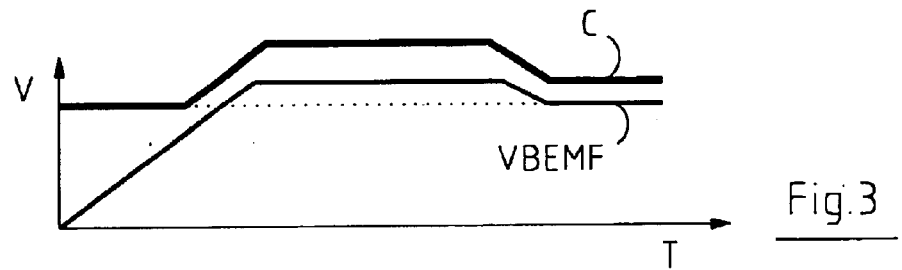
FIG. 3 is a graph of the voltage values on the power stage of the device in FIG. 1 and of the VBEMF of the motor.

The control block 3 acts on the power stage 2 and, in certain periods of time, on the step-up 4 in reply to low or high values of the speed of the motor or of the VBEMF, given that the VBEMF depends in a linear manner on the speed of the motor. More precisely, the control block 3 acts on the power stage 1 to change the value of the duty-cycle by means of a signal D, when the voltage VBEMF is less than or equal to the supply voltage Vdd, and acts on the step-up 4 to enable it and supply it with a voltage signal P equivalent to the voltage VBEMF of the motor 2 when the VBEMF becomes greater than or comparable with the supply voltage Vdd. The graph shown in FIG. 3 highlights the fact that the voltage signal C in input to the power stage 1, and therefore used for driving the motor 2, must follow and must always be greater than the voltage VBEMF.

Figure 2:
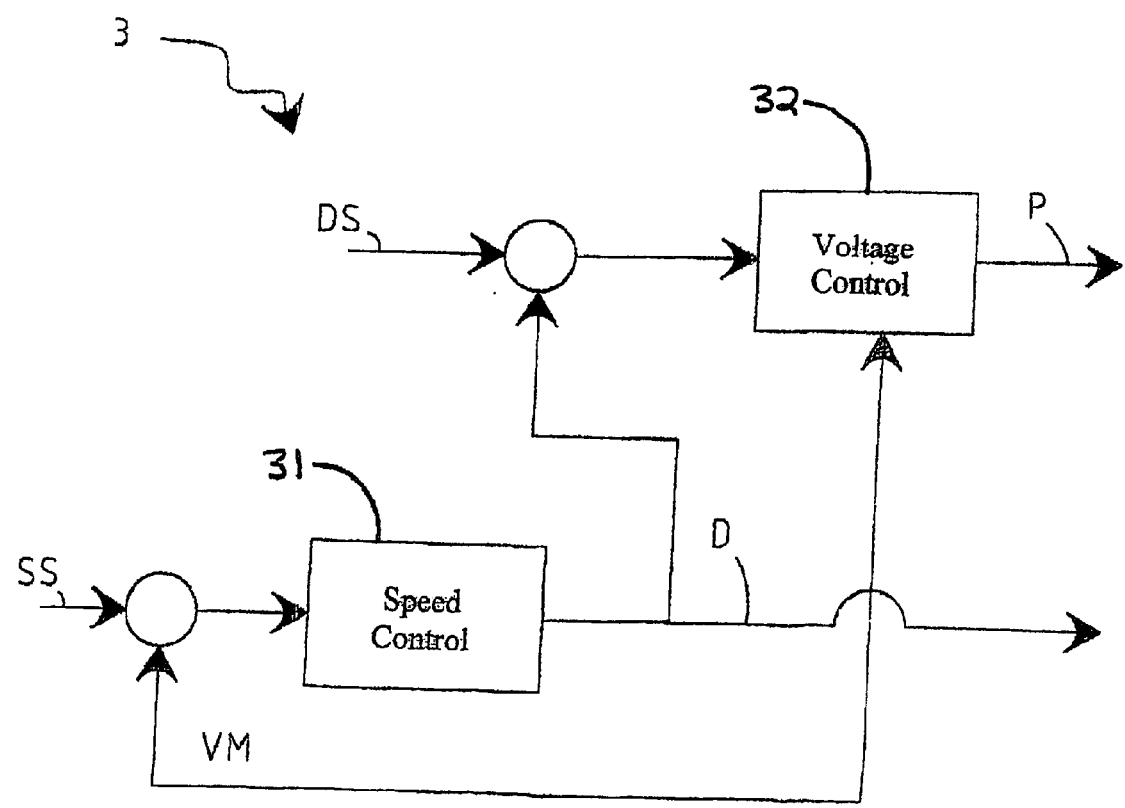
FIG. 2 is a more detailed view of the control block in FIG. 1.

The control block 3 is shown in greater detail in FIG. 2. This block comprises a device 31 for controlling the speed, for example a PID, that compares the data relating to the value of the speed of the motor and to the value of the speed set externally by means of the signal SS, and generates the output signal D to vary the duty-cycle of the power stage 1 in the event the value of the speed contained in the signal VM is greater than the value of the speed of the signal SS. The block 3 also comprises a block 32 for controlling the output voltage, consisting for example of a PID, that compares the data relating to the value of the duty-cycle set externally by means of the signal DS (generally this duty-cycle is approximately 80%) and to the value of the duty-cycle of the signal D, and generates the signal P in input to the step-up 4 in the event the value of the duty-cycle contained in the signal D is greater than the value of the duty-cycle of the signal DS.

The operation of the device in FIG. 1 is therefore the following. The power stage 1 fed by a supply voltage Vdd supplies in turn a supply voltage C to the motor 2; the control block 3 by means of the signal VM coming from the motor 2 provides for the control of the power stage 1 and the enabling and supplies the signal P to the step-up 4. More precisely this block 3 verifies, by means of the internal block 31, whether the rotation speed of the motor 2 is lower or higher than a set speed contained in the signal SS. In the event the speed of the motor 2 is greater than the set speed SS and in the event the supply voltage Vdd is greater than the voltage VBEMF of the motor 2, a condition that is verified by the fact that the duty-cycle contained in the signal D is lower than the duty cycle set externally, the block 31 varies the duty-cycle of the power stage 2 by means of the signal D. In the event instead the voltage VBEMF of the motor 2 becomes comparable with or greater than supply voltage Vdd, a condition verified by a duty-cycle contained in the highest signal D of the duty-cycle DS set, the block 32 enables the step-up 4 and sends it a voltage signal P equivalent to the voltage VBEMF. In that case the step-up 4 raises the input voltage P so as to have a voltage output signal C, which is always greater than the voltage VBEMF and at such a value that enables the power stage 1 to correctly drive the motor 2.

Figure 4:
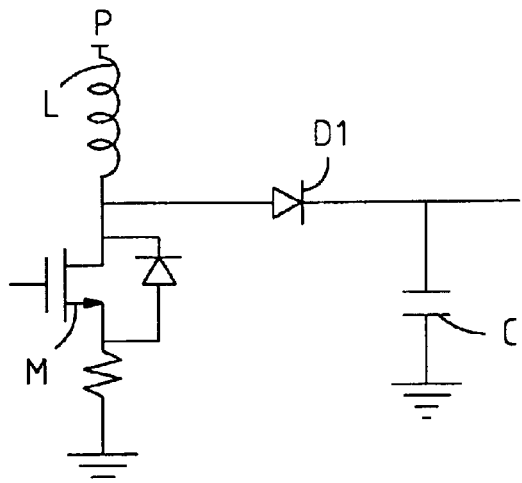
FIG. 4 is a schematic view of an embodiment of the step-up block in FIG. 1.

The step-up 4 can be for example like that described in FIG. 4, where an inductive type step-up is shown. A current is loaded in an inductance by means of an MOS M transistor that can also be replaced in alternative by a DMOS or BJT transistor. When the transistor M is turned off, the inductance L generates an extra voltage that is greater than the value of the supply voltage given by the signal P that brings the diode D1 to conduction and enables the transfer of the load at the capacity of filter C that presents a voltage at its ends which is greater than the supply voltage P.

In alternative the step-up 4 can be replaced by a charge pump that allows the input voltage to be increased in certain periods of time.

Figure 5:
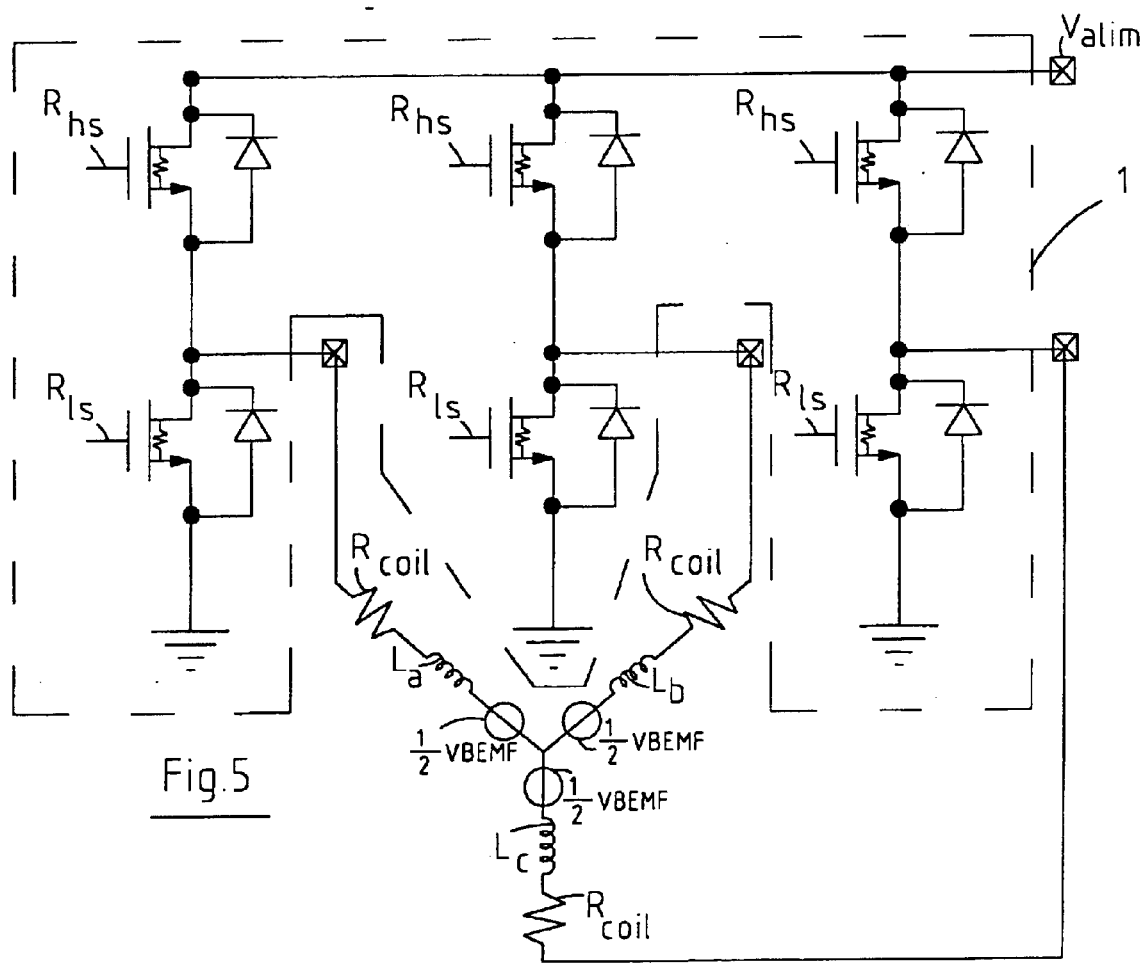
FIG. 5 is a schematic view of a brushless motor.

The electric motor 2 can be for example a brushless motor of the type shown in FIG. 5 in which, considering the resistances Rcoil of the coils La, Lb, Lc with value of Rcoil=2Ω and the resistances Rhs and Rls of the low-side and high-side MOS belonging to the power stage 1 equal and of the value of 0.5Ω, and given that for good operation of the motor a current I of approximately 1A is necessary, we have the supply voltage of the motor that must be approximately 3V greater than the voltage VBEMF: Valim=VBEMF+I*R where R indicates the total resistance given by R=2*Rcoil+Rhs+Rls.

The blocks 31 and 32 consist of PID built by means of analogical or digital filters.

What is claimed is:

1. A device for driving electric motors comprising a power stage with a variable duty-cycle coupled to a supply voltage, said power stage for driving the electric motor, wherein the device comprises a circuit for raising the value of an input voltage signal of said power stage above the induced counter electromotive voltage of the electric motor in certain periods of time,and a control device for activating said circuit in reply to values of said induced counter electromotive voltage being greater than or comparable with the supply voltage.

2. The device according to claim 1, wherein said circuit comprises a charge pump.

3. The device according to claim 1, wherein said motor is a brushless motor.

4. A device for driving electric motors comprising a power stage with a variable duty-cycle coupled to a supply voltage, said power stage for driving the electric motor, wherein it comprises a circuit for raising the value of the input voltage signal of said power stage above the induced counter electromotive voltage of the motor in certain periods of time and a control device for activating said circuit in reply to values of said induced counter electromotive voltage greater than or comparable with the supply voltage, and wherein said control device comprises a first block capable of comparing the value of the rotation speed of the electric motor with a speed value set externally and generating a first signal for varying the duty-cycle of said power stage if the value of said rotation speed of the electric motor is greater than the speed value set externally, and a second block for comparing said duty-cycle contained in said first signal with a duty-cycle set externally and enabling said circuit and generating a second signal equivalent to said induced counter electromotive voltage in input to said circuit if said duty-cycle contained in said first signal is greater than the duty-cycle set externally.

5. The device according to claim 4, wherein said duty-cycle set externally corresponds to the value of the supply voltage.

6. A device for driving electric motors comprising a power stage with a variable duty-cycle coupled to a supply voltage, said power stage for driving the electric motor, wherein it comprises a circuit for raising the value of the input voltage signal of said power stage above the induced counter electromotive voltage of the motor in certain periods of time and a control device for activating said circuit in reply to values of said induced counter electromotive voltage greater than or comparable with the supply voltage, and wherein said circuit comprises a step-up circuit.

7. A device for driving electric motors comprising a power stage with a variable duty-cycle coupled to a supply voltage, said power stage for driving the electric motor, wherein it comprises a circuit for raising the value of the input voltage signal of said power stage above the induced counter electromotive voltage of the motor in certain periods of time and a control device for activating said circuit in reply to values of said induced counter electromotive voltage greater than or comparable with the supply voltage, and wherein said circuit raises tire value of said input voltage signal of said power stage so that said voltage signal is always greater than said induced counter electromotive voltage of the motor but follows its time course.

* * * * *